US012748016B2

(12) United States Patent
Caleff et al.

(10) Patent No.: US 12,748,016 B2

(45) Date of Patent: Sep. 29, 2026

(54) SELF-CALIBRATION

(71) Applicant: Essilor International, Charenton-le-pont (FR)

(72) Inventors: Florian Caleff, Charenton-le-pont (FR); Fabien Muradore, Charenton-le-pont (FR); Shuang Ding, Charenton-le-pont (FR); Jou-Cheng Lin, Charenton-le-pont (FR)

(73) Assignee: Essilor International, Charenton-le-Pont (FR)

( * ) Notice: Subject to any disclaimer, the term of this patent is extended or adjusted under 35 U.S.C. 154(b) by 149 days.

(21) Appl. No.: 18/850,608

(22) PCT Filed: Mar. 30, 2023

(86) PCT No.: PCT/EP2023/058342

§ 371 (c)(1),
(2) Date: Sep. 25, 2024

(87) PCT Pub. No.: WO2023/187080

PCT Pub. Date: Oct. 5, 2023

(65) Prior Publication Data

US 2025/0224305 A1 Jul. 10, 2025

(30) Foreign Application Priority Data

Mar. 31, 2022 (EP) .................................... 22305429

(51) Int. Cl.
*G01M 11/02* (2006.01)

(52) U.S. Cl.
CPC .... *G01M 11/0264* (2013.01); *G01M 11/0221* (2013.01)

(58) Field of Classification Search
CPC .......... G01M 11/0264; G01M 11/0221; H04N 17/002; G06T 2200/24; G06T 2207/10024; G06T 2207/30208; G06T 7/80
See application file for complete search history.

(56) References Cited

U.S. PATENT DOCUMENTS

2012/0287287 A1* 11/2012 Grossmann .......... H04N 17/002 348/181
2018/0262748 A1 9/2018 Shibata et al.
(Continued)

FOREIGN PATENT DOCUMENTS

CN 107705335 A 2/2018
EP 3 128 362 A1 2/2017
(Continued)

OTHER PUBLICATIONS

International Search Report and Written Opinion issued on Jul. 5, 2023 in PCT/EP2023/058342 filed on Mar. 30, 2023, 16 pages.
(Continued)

*Primary Examiner* — Tarifur R Chowdhury
*Assistant Examiner* — Carlos Perez-Guzman
(74) *Attorney, Agent, or Firm* — Oblon, McClelland, Maier & Neustadt, L.L.P.

(57) ABSTRACT

A method for determining parameters of an image acquisition module of an electronic device, the electronic device having a display screen and the image acquisition module on the same side of the electronic device. The method includes an initialization step where a first pattern is displayed on the display screen, a positioning step where the electronic device is positioned in front of a mirror, an orientation step where the electronic device is oriented in a particular orientation, an orientation confirmation step where the electronic device is maintained in the particular orientation during a period of time, a reference point determination step
(Continued)

where the set of fourth elements of the second pattern are detected and a reference point associated to each fourth element is determined, and an image acquisition module parameter determination step where the image acquisition module parameter is determined.

18 Claims, 5 Drawing Sheets

(56) References Cited

U.S. PATENT DOCUMENTS

2019/0266753 A1* 8/2019 Dworakowski ........... G06T 7/73
2022/0130064 A1* 4/2022 Tomar ................... G06T 19/006

FOREIGN PATENT DOCUMENTS

WO WO 2017/134275 A1 8/2017
WO WO 2021/140204 A1 7/2021

OTHER PUBLICATIONS

Delaunoy et al., "Two Cameras and a Screen: How to Calibrate Mobile Devices?", 2014 Second International Conference on 3D Vision, IEEE, vol. 1, Dec. 2014, pp. 123-130, XP032733148.
Fu et al., "Automatic camera calibration method based on projective transformation", 2021 IEEE International Conference on Advances in Electrical Engineering and Computer Applications (AEECA), pp. 661-665, XP034005300.
Bae et al., "[MPEG-I Visual] Camera Array based Windowed 6-DoF Contents", 119. MPEG Meeting, Jul. 2017, 3 pages, XP030069370.

* cited by examiner

SELF-CALIBRATION

CROSS-REFERENCE TO RELATED APPLICATION(S)

The present application is a national stage application of PCT Application No. PCT/EP2023/058342, filed Mar. 30, 2023, which claims priority to European Patent Application No. 22305429.7, filed Mar. 31, 2022. The benefit of priority is claimed to each of the foregoing, and the entire contents of each of the foregoing are incorporated herein by reference.

TECHNICAL FIELD

The disclosure relates to calibration method for determining at least one parameter of an image acquisition module of an electronic device.

BACKGROUND

Usually, a person wishing to have an optical equipment goes over to an eye care practitioner.

The determination of the wearer's prescription and fitting data may require carrying out complex and time-consuming measurements. Such measurements usually require complex and costing material and qualified personnel to be carried out.

However, recent developments allow using an electronic device, such as a smartphone to determine optical parameters of a person, such as the prescription of the wearer or the fitting parameter, or optical parameter of an optical device.

An example of the use of a portable electronic device to determine an optical parameter of a lens of eyewear adapted for a person is disclosed in WO 2019/122096.

The use of a portable electronic device to determine optical parameters requires knowing some of the characteristics of the portable electronic device.

The variety of different portable electronic devices available requires having a calibration protocol that is easy to implement and allows determining parameters of a portable electronic device to determine if such device may be used to determine specific optical parameters and the key characteristic of such portable electronic devices that are required to determine the optical parameters.

The calibration method of the disclosure is an alternative to a characterization process that is usually done in a laboratory with specific metrological equipment. Such characterization process is often done as a conclusion of a manufacturing process of the electronic device and renewed regularly to maintain the precision of the device.

Such characterization process requires specific metrological equipment and highly trained professional and therefore may not be carried out on a large scale for a great variety of portable electronic devices.

The existing smartphone application uses many of the integrated hardware sensors to allow a simple and precise determination of parameters relative to the prescription of an optical device, for example lens fitting. Such applications are usually used on pre-qualified smartphones which have been individually calibrated in a laboratory. This calibration can be done on a single sample of a given model if the dispersion of the characteristic parameters is known to be low enough. Otherwise, the calibration needs to be done on each smartphone individually. This is particularly the case for smartphones running with Android or Windows® operating systems. These operating systems are used for a broad number of smartphones, and these smartphones have different image acquisition module parameters.

This could also be extended to other portable electronic devices provided with an image acquisition module placed on the same side of a display screen.

Therefore, there is a need for a method for determining at least one parameter of the image acquisition module of an electronic device that can be easily implemented by an untrained user and for calibrating any portable electronic device without requiring the use of specific metrological equipment or requiring the presence of an eyecare professional or a trained professional.

One object of the present disclosure is to provide such a calibration method.

SUMMARY OF THE DISCLOSURE

To this end, the disclosure relates to a method for determining at least one parameter of an image acquisition module of an electronic device, the electronic device having a display screen and the image acquisition module on the same side of the electronic device, the method comprises the following steps:

a) an initialization step, wherein a first pattern is displayed on the display screen:
   - the first pattern comprises a first element, a second element and a third element,
   - the first element having a fixed location on the display screen,
   - the second element is movable over the screen based on the orientation of the electronic device, and
   - the third element has a particular shape corresponding to a particular positioning of the second element with respect to the first element, b) a positioning step, wherein the electronic device is positioned in front a mirror, the display screen facing the mirror, c) an orientation step, wherein the electronic device is oriented in a particular orientation such that the second element of the first pattern is moved to reach a target position,
   - wherein when the target position is reached, the positioning of the second element with respect to the first element forms a shape identical to the particular shape of the third element, d) an orientation confirmation step, wherein the electronic device is maintained in the particular orientation during a period of time, then:
   - the first pattern is no longer displayed
   - a second pattern is displayed, the second pattern comprising a set of fourth elements having fixed locations on the screen, and
   - a picture of the second pattern seen through the mirror is acquired by the image acquisition module, e) a reference point determination step, wherein said set of fourth elements of the second pattern are detected and a reference point associated to each said fourth elements is determined, steps a) to e) are reiterated several times, wherein each time the position of the first element of the first pattern is different, resulting in different orientations of the electronic device in the orientation step c), and f) image acquisition module parameter determination step, wherein based on said reference points of each element of the set of fourth elements obtained during each orientation of the electronic device, the image acquisition module parameter is determined.

Advantageous, the method of determination of the disclosure is an assisted determination method. Providing indications to the user, the calibration method of the disclosure relies as little as possible on the user operating the method and does not require any specific knowledge. Additionally, the method requires a low effort from the user.

Advantageously, the method enables to determine at least one parameter of an image acquisition module regardless the type of electronic device, as long as the image acquisition module, for example a front camera, is placed on the same side of the electronic device as the display screen.

According to further embodiments of the method which can be considered alone or in combination:

- the image acquisition module comprises a camera having a lens and the image acquisition module parameter is a parameter of the lens of the image acquisition itself, and/or
- intrinsic parameters of the image acquisition device are unknown, prior step a) of the method; and/or
- extrinsic parameters of the image acquisition device are unknown, prior step a) of the method; and/or
- during each reiteration, prior to step a), the method comprises the following steps:
  - g) a controlling step wherein, it is controlled that the new position of the first element of the first pattern would lead to an orientation of the electronic device which is different from the orientation of the electronic device which has already been achieved in one of the previous iterations of steps a) to e); and/or
- the first element and the third element of the first pattern form a single element, wherein during the orientation step c), the electronic device is oriented in a particular orientation such that the second element fully overlaps a portion of the third element; and/or
- the electronic device comprises a top portion and a bottom portion, and the top portion is positioned above the bottom portion in each occurrence of the positioning and orientation steps b) and c), the electronic device remaining substantially vertical during each of the positioning and orientation steps b) and c); and/or
- the steps a) to e) are repeated at least 4 times, and in each of the orientation step c), the electronic device is rotated at most according to one rotational degree of freedom; and/or
- the steps a) to e) are repeated at least 9 times; and/or
- the second pattern, comprising the set of fourth elements, is a grid of circular elements; and/or
- the number and/or the dimension of the circular elements is depending on the dimension of the display screen; and/or
- the dimension of the display screen is defined in pixels; and/or
- each of the circular elements comprises a disc, the discs having a different color from the rest of the display screen; and/or
- the circular elements reference point determination step e), comprises, for each of the circular elements, the following sub-steps:
  - cropping the image around the disc,
  - detecting the contour of the disc,
  - approximating the contour of the disc by an ellipse,
  - determining the reference point being the center of the ellipse; and/or
- wherein each of the circular elements comprises an annular element; and/or
- the circular elements reference point determination step e), comprises, for each of the circular elements, the following sub-steps:
  - detecting an external contour of the annular element,
  - cropping the image around the external contour of the annular element,
  - detecting an internal contour of the annular element,
  - approximating the external contour of the annular element by a first ellipse,
  - approximating the internal contour of the annular element by a second ellipse,
  - determining the center of the first ellipse and the center of the second ellipse,
  - determining the reference point based on the center of the first and second ellipses; and/or
- the annular elements and the other portion of the screen have different colors, preferably the annular elements are black and the remaining portion of the display screen white; and/or
- the annular elements are green, and the remaining portion of the screen is black; and/or
- each of the circular elements comprises a disc and annular elements, the disc elements being contained in the annular elements; and/or
- the annular elements and the disc elements have different colors; and/or
- the second pattern, comprising the set of fourth elements, is composed by elements having different shapes and/or different colors; and/or
- the number and/or the dimension of the fourth elements is depending on the dimension of the display screen; and/or
- the different shapes comprise circular and/or annular and/or triangular and/or rectangle and/or square and/or polygonal shapes; and/or
- the elements reference point determination step e), comprises, for each of the polygonal elements, the following sub-steps:
  - detecting a contour of the polygonal element,
  - cropping the image around the contour of the polygonal element,
  - detecting the vertices and edges of the polygonal element,
  - determining the reference point based on the centroid polygonal element; and/or
- the reference point being determined as the center of gravity of the vertices, or as the center of the incircle or circumscribed circle of the polygonal element, or using the plumb line method or the balancing method; and/or
- the portable electronic device is a smartphone or a personal digital assistant or a laptop or a webcam or a tablet computer; and/or
- the image acquisition module comprises a camera having a lens and the at least one image acquisition module parameter is:
  - the focal length of the lens of the image acquisition module; and/or
  - a chromatism parameter of the lens of the image acquisition module; and/or
  - a luminosity parameter of the lens of the image acquisition module; and/or
  - a distortion coefficient of the lens of the image acquisition module; and/or
  - the optical center of the lens of the image acquisition module; and/or
  - a dioptric optical power of the lens of the image acquisition module; and/or an optical cylinder of the lens of the image acquisition module; and/or an optical cylinder axis in a visual reference zone of the lens of the image acquisition module; and/or a prismatic power of the lens of the image acquisition module; and/or a prism orientation of the lens of the image acquisition module; and/or a transmittance of the lens of the image acquisition module; and/or a color of the lens of the image acquisition module; and/or the position of the optical center on the lens of image acquisition module; and/or the distortion coefficient comprises radial distortion and/or tangential distortion and/or barrel distortion and/or pincushion distortion and/or decentering distortion and/or thin prism distortion; and/or the portable electronic device is to be used to determine at least one of optical fitting parameters of a user, optical parameters of an optical lens, acuity parameters of a user; and/or the fitting parameters comprises the distance between the center of both pupil of the eyes of the user; and/or the fitting parameters comprises the distances between the center of each pupil and the sagittal plane of the user, and/or the fitting parameters comprises an indication of the height of the center of each pupil of the user, and/or the fitting parameters comprises indication of the shape of the nose of the user; and/or the fitting parameters comprises indication of the shape of the cheekbone of the user; and/or the optical parameter of the lens comprises the dioptric function of the optical lens; and/or the optical parameter of the lens comprises the optical power in a visual reference zone of the optical lens; and/or the optical parameter of the lens comprises the optical cylinder in a visual reference zone of the optical lens; and/or the optical parameter of the lens comprises the optical cylinder axis in a visual reference zone of the optical lens; and/or the optical parameter of the lens comprises the prism base in a visual reference zone of the optical lens; and/or the optical parameter of the lens comprises the prism axis in a visual reference zone of the optical lens; and/or the optical parameter of the lens comprises the type of optical design of the optical lens; and/or the optical parameter of the lens comprises the transmittance of the optical lens; and/or the optical parameter of the lens comprises the color of the optical lens; and/or the optical parameter of the lens comprises the position of the optical center on the lens.

Another object of the disclosure is a computer program product comprising one or more stored sequences of instructions which, when executed by a processing unit, are able to perform the parameter determining step of the method according to the disclosure.

The disclosure further relates to a computer program product comprising one or more stored sequences of instructions that are accessible to a processor and which, when executed by the processor, causes the processor to carry out at least the steps of the method according to the disclosure.

The disclosure also relates to a computer-readable storage medium having a program recorded thereon; where the program makes the computer execute at least the steps of the method of the disclosure.

The disclosure further relates to a device comprising a processor adapted to store one or more sequences of instructions and to carry out at least steps of the method according to the disclosure.

BRIEF DESCRIPTION OF THE DRAWINGS

Non limiting embodiments of the disclosure will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present disclosure.

DETAILED DESCRIPTION OF THE DRAWINGS

The disclosure relates to a method, for example at least partly implemented by computer means, for determining at least one parameter of an image acquisition module 12 of an electronic device 10.

The electronic device further comprises a display screen 14.

The electronic device 10 may be a smartphone or a personal digital assistant or a laptop or a webcam or a tablet computer.

The image acquisition module 12 is located on the same side of the electronic device 10 than the display screen 14. The image acquisition module 12 may typically be a camera.

In a preferential embodiment, the image acquisition module 12 comprises a lens.

The electronic device may be portable, and for example may further comprise a battery.

The electronic device may comprise processing means that may be used to carry out at least part of the steps of the method of determination according to the disclosure.

The method aims at determining parameters of the image acquisition module 12 of the electronic device 10.

Figure 1:
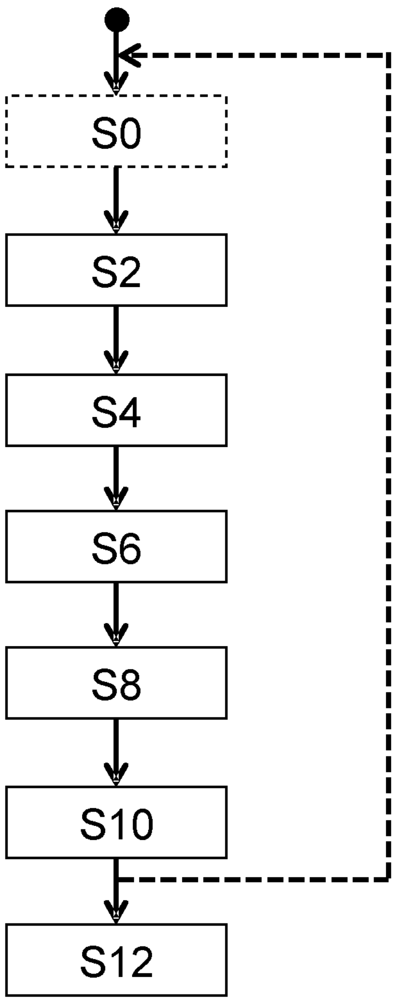
FIG. 1 is a flowchart of a method for determination according to the disclosure.

FIG. 1 discloses a block diagram illustrating the different steps of the determining method according to the disclosure.

The method comprises a first step S2 being an initialization step, wherein a first pattern 16 is displayed on the display screen 14.

The first pattern 16 comprises a first element 16*a*, a second element 16*b* and a third element 16*c*.

The first element 16*a* has a fixed location on the display screen. The second element 16*b* is movable over the display screen 14 based on the orientation of the electronic device 10.

An element having a fixed location implies that said element remains static over the display screen 14, when the electronic device 10 is moved.

An element is considered to be movable, when the position of the element on the screen is dependent on the orientation of the electronic device 10. By rotating the electronic device 10, the movable element moves on the display screen.

The third element 16*c* has a given shape. By achieving a particular positioning of the second element 16*b* with respect to the first element 16*a*, the particular shape of the third element 16*c* is reproduced.

The method comprises a second step S4 being a positioning step, wherein the electronic device 10 is positioned in front a mirror 18 (shown FIG. 4*a* to 4*c*), in a manner where the display screen 14 faces the mirror 18.

Based on said positioning of the electronic device 10 with respect to the mirror 18, the content of the display screen 14 is reflected on the mirror and can be acquired by the image acquisition module 12, when desired.

The method comprises a third step S6 being an orientation step, wherein the electronic device 10 is oriented, with respect to the mirror 18, in a particular orientation such that the second element 16*b* of the first pattern 16 moves, based on a rotation of the electronic device 10 provided by the user, to reach a target position.

The target position is reached, when the positioning of the second element 16*b* with respect to the first element forms a shape identical to the particular shape of the third element 16*c*.

Advantageously, the third element 16*c* is displayed on the screen to help the user to rightfully position the second element 16*b* with respect to the first element 16*a*, so as to form together a shape identical to the third element 16*c*.

Advantageously, the third element 16*c* is displayed to help the user when orienting the electronic device and to show the shapes to be achieved by having the second element 16*b* moved with respect to the first element 16*a*.

The method comprises a fourth step S8 being an orientation confirmation step, wherein the electronic device is maintained in the particular orientation over a period of time.

For example, the period of time may be 1.5 s, preferably 1s, even more preferably 0.5 s.

After the electronic device 10 has been maintained in position for the given period of time, the first pattern 16 is no longer displayed. Once the first pattern 16 has disappeared, a second pattern 20 is displayed.

The second pattern comprises a set of fourth elements 20*a* having fixed locations on the screen.

The second pattern may be a set of circular elements. The second pattern may be a set of square elements or rectangular elements or polygonal elements or triangular elements or star shape elements.

For circular elements, the reference point can be the center of the circular element.

For square elements or the rectangular elements, the reference point can be the intersection of the diagonals.

For triangular elements, the reference point can be the intersection of the medians, bisectors or the perpendicular bisectors.

For polygonal elements, the reference point can be the centroid of the polygon, which can be computed as the center of gravity of its vertices, or for example using the plumb line method or the balancing method.

The second pattern may comprise fourth elements 20*a* having different shapes, for example a combination of circular and/or square and/or rectangular and/or polygonal and/or triangular and/or star shape elements.

A picture of the second pattern 20, seen through the mirror 18, is acquired by the image acquisition module 12.

The method comprises a fifth step S10 being a reference point determination step, wherein said set of fourth elements 20*a* of the second pattern 20 are detected on the acquired image. A reference point associated with each of said fourth elements 20*a* is determined.

Steps S2 to S10 are reiterated several times, wherein each time the position of the first element 16*a* of the first pattern 16 is different, resulting in different orientations of the electronic device 10 in the orientation step S6.

Finally, the method comprises a sixth step S12 that is an image acquisition module 12 parameter determination step. Based on the reference points of each element 20*a* of the set of fourth elements obtained during each orientation of the electronic device 10, the image acquisition module parameter is determined.

To determine the image acquisition module parameter value, the following parameters should be considered:

- $f_x$, $f_y$ be the focals of the device according to the abscissa and the ordinate axis of the three-dimensional reference system R,
- $u_0$, $v_0$ the image center according to the abscissa and the ordinate axis a two-dimensional reference system R2,
- $k_1$, $k_2$, $k_3$ be the radial distortion coefficients, and
- $p_1$, $p_2$ the tangential distortion coefficients.

A given point is defined as $Q=(X_Q, Y_Q, Z_Q)$ in a three-dimensional reference system R being attached to the image acquisition module 12.

The three-dimensional reference system R may be a three-dimensional reference system specific to the image acquisition module 12, for example centered on the lens of the image acquisition module.

A projection of a point Q defined $(X_Q, Y_Q, Z_Q)$ defined in R on an image acquired by the image acquisition module 12, having the two-dimensional reference system R2, is defined as $(u,v)=\Phi(Q)$ and is calculated by the following steps:

1) Determination of the projected coordinates on a normalized image plane:

$$X_N = \frac{X_Q}{Z_Q} \text{ and } Y_N = \frac{Y_Q}{Z_Q},$$

2) Determination of the squared norm:

$$n = X_N^2 + Y_N^2,$$

3) Determination of the distortion factor: $\alpha=1+k_1 n+k_2 n^2+k_3 n^3$,

4) Determination of the distortion corrections:

a.

$$\text{a. } u' = \alpha X_N + 2p_1 X_N Y_N + p_2(n + 2X_N^2)$$

$$\text{b. } v' = \alpha Y_N + 2p_2 X_N Y_N + p_1(n + 2Y_N^2), \text{ and}$$

and

5) Determination of the projection: $u=f_x u'+u_0$ and $v=f_y v'+v_0$

Figure 9:
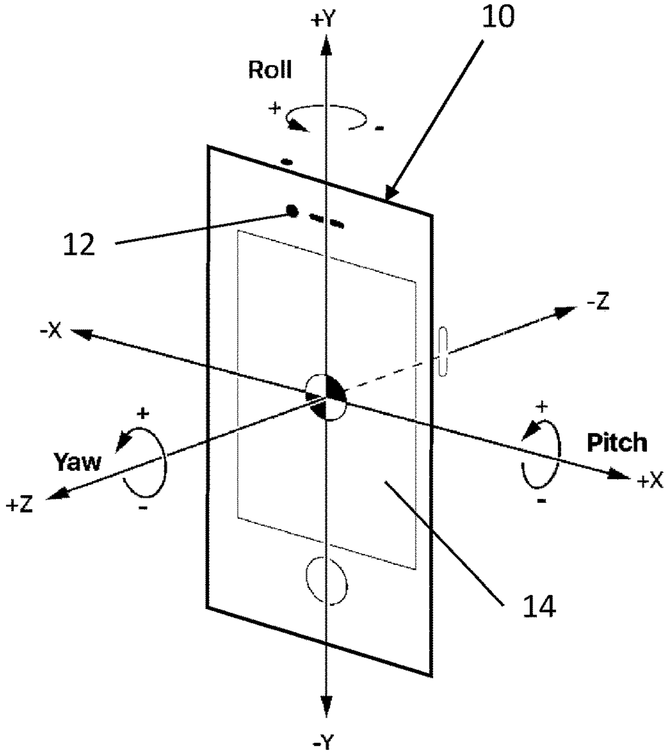
FIG. 9 illustrates an electronic device according to the invention and pitch, roll, and yaw axes.

When performing Steps S2 to S10 according to the invention, N images $I_k$, with k=1, . . . , N of the second pattern 20 are acquired. The second pattern 20 comprises m points $P_i=(X_i, Y_i, Z_i)$ with i=1, . . . , m, wherein Zi is constant. Xi and Yi are defined along orthogonal axis X and Y of a plane, wherein the plane is defined by the display screen 14 of the electronic device 10 (as shown in FIG. 9).

In each image $I_k$, m reference points are acquired during the reference point determination step S10. One reference point is determined for each fourth element 20*a*.

The coordinates, in the two-dimensional reference system R2, of each of the m reference points on the image $I_k$ are determined by the projection $(u_{k,i}, V_{k,i})$, with k=1, . . . , N and i=1, . . . , m.

Each image $I_k$ acquired by the image acquisition module 12 may have a different number of reference points $m_k$ based on the number of fourth elements displayed on the display screen 14 and/or based on the number of fourth elements visible on the acquired image based on the orientation of the electronic device 10, induced by the degree of rotation of said electronic device with respect to the mirror 18.

For the simplicity of the disclosure, the number of reference points $m_k$ is kept identical among the different images $I_k$ acquired by the image acquisition module 12.

For each image $I_k$, with k=1, . . . , N, the image formed by the reflection of the second pattern 20 displayed by the display screen 14 on the mirror 18 varies in the three-dimensional referential system R, resulting in different acquired images $I_k$. This position of the image of the second pattern 20 is defined by a rotation matrix $M_k$ and a translation vector $T_k$.

The points $P_i=(X_i, Y_i, Z_i)$, with i=1, . . . , m and with $Z_i=0$ formed on the second pattern 20, for a given orientation of the electronic device 10, are then expressed in the three-dimensional referential system R by:

$$Q_{k,i} = M_k P_i + T_k$$

The projection of the points $Q_{k,i}$, defined in the three-dimensional reference system R, in the two-dimensional reference system R2 of the image should correspond to the detected points:

$$(u_{k,i}, v_{k,i}) = \Phi(Q_{k,i})$$

As describe in Burger, Wilhelm, "*Zhang's Camera Calibration Algorithm: In-Depth Tutorial and Implementation*", 2016, a procedure enables to calculate the parameters of the image acquisition module, such as the radial or the tangential distortion coefficients $k_1$, $k_2$, $k_3$, $p_1$, $p_2$ and the intrinsic parameters $f_x$, $f_y$, $u_0$, $v_0$.

Said radial distortion coefficients $k_1$, $k_2$, $k_3$, of the distortion factor a, and tangential distortion coefficients $p_1$, $p_2$, of the distortion corrections u' and v', and the intrinsic parameters $f_x$, $f_y$, $u_0$, $v_0$ are derived from the position $(u_{k,i}, V_{k,i})$ of each reference point $Q_{k,i}$ in each of the image $I_k$ acquired by the image acquisition module 12, and the points $P_i=(X_i, Y_i, Z_i)$ with i=1, . . . , m, considering the following steps:

1) providing an estimation of an homography for each image $I_k$,
   the homography is a way to estimate the relative position of the second pattern 20 with respect to the image acquisition module 12 in the three-dimensional reference system R.
2) calculation of the intrinsic parameters $f_x$, $f_y$, $u_0$, $v_0$.
3) estimation of the extrinsic parameters, for each image $I_k$, being the rotation matrix $M_k$ and the translation vector $T_k$.
4) calculation of the distortion coefficients.

The calculated distortion coefficients may be the radial distortion coefficients $k_1$, $k_2$, $k_3$ or the tangential distortion coefficients $p_1$, $p_2$.

The determination of the homography may involve a non-linear refinement.

In a preferred embodiment, an optimization algorithm is used in order to provide a better estimate of the parameters of the image acquisition module 12, such as the radial or the tangential distortion.

The optimization algorithm may be a Levenberg-Marquardt algorithm.

In said Levenberg-Marquardt algorithm, a cost function may be calculated taking into consideration the known second pattern 20 comprising the m points $P_i=(X_i, Y_i, Z_i)$ with i=1, . . . , m and the known detected reference points $(u_{k,i}, V_{k,i})$, with k=1, . . . , N and, i=1, . . . , m $$J(\omega) = \sum_{k=1}^{N}\sum_{i=1}^{m}\left\|\Phi(M_k(\omega)P_i + T_k(\omega)) - \begin{pmatrix} u_{k,i} \\ v_{k,i} \end{pmatrix}\right\|^2$$

where the vector ω of variables comprises:

the intrinsic parameters $f_x$, $f_y$, $u_0$, $v_0$, the distortion coefficients $k_1$, $k_2$, $k_3$, $p_1$, $p_2$, the extrinsic parameters:

3 parameters for each rotation matrix $M_k$, and 3 parameters for each translation vector $T_k$.

The extrinsic parameters are exclusive to each of the acquired image $I_k$. Therefore, the vector ω comprises 9 parameters defined by the intrinsic and distortion coefficients, as well as 6×N parameters (3 parameters for each rotation matrix $M_k$ and 3 parameters for each translation vector $T_k$), with N defining the number of acquired images by the image acquisition module 12.

Given the parameters vector ω, the projection (P can be calculated.

The vector ω comprises parameters, $\omega_0, \ldots, \omega_8$ corresponds to the intrinsic and distortion coefficients $f_x$, $f_y$, $u_0$, $v_0$, $k_1$, $k_2$, $k_3$, $p_1$, $p_2$, the other parameters $\omega_9, \ldots, \omega_{9+6(N-1)+5}$ corresponding to the extrinsic parameters linked to the rotations (rotation matrix $M_k$) and translations (translation vector $T_k$) of each image $I_k$.

The projection Φ can be calculated with the following steps:

Step 1: Extrinsic Parameters Determination for Each of the Images $I_k$, with k=1, . . . , N A vector $R_k(\omega)=(\omega_{9+6(k-1)+0}, \omega_{9+6(k-1)+1}, \omega_{9+6(k-1)+2})$, having 3 parameters, leads to the determination of the rotation matrix $M_k$, using the Euler-Rodrigues method.

Said determination comprises the following sub-steps:

1) Defining an angle: $\theta_k(\omega)=\|R_k(\omega)\|$,

2) Defining the unit vector of the vector $$R_k(\omega):\overline{R}_k(\omega) = \left(\overline{X}_k^R(\omega) \quad \overline{Y}_k^R(\omega) \quad \overline{Z}_k^R(\omega)\right) = \frac{R_k(\omega)}{\|R_k(\omega)\|},$$

3) Defining an intermediate matrix:

$$A_k(\omega) = \begin{pmatrix} 0 & -\overline{Z}_k^R(\omega) & \overline{Y}_k^R(\omega) \\ \overline{Z}_k^R(\omega) & 0 & -\overline{X}_k^R(\omega) \\ -\overline{Y}_k^R(\omega) & \overline{X}_k^R(\omega) & 0 \end{pmatrix},$$

4) Determining the rotation matrix $M_k$: $M_k(\omega)=I_3+\sin(\theta_k(\omega))\,A_k(\omega)+(1-\cos(\theta_k(\omega)))A_k(\omega)A_k(\omega)$, with $I_3$ being the identity matrix.

The translation vector $T_k$ is determined by the following parameters of the vector ω, $$T_k(\omega) = (\omega_{9+6(k-1)+3}, \omega_{9+6(k-1)+4}, \omega_{9+6(k-1)+5}).$$

Step 2: Determining of the Reference Point $P_i$ in the Three-Dimensional Reference System R For each of the acquired images $I_k$, with k=1, . . . , N, and each of the points $P_i$ of the given acquired image, with i=1, . . . , m, the points $P_i$ are defined in the three-dimensional reference system R based on the following equation:

$$Q_{k,i}(\omega) = M_k(\omega)P_i + T_k(\omega)$$

Step 3: Determining an Error Between the Projection of the Reference Point $Q_{k,i}(\omega)$ and the Two-Dimension Coordinated of the Detected Reference Points on the Image in the Two-Dimensional Reference System R2:

For each of the acquired images $I_k$, with k=1, . . . , N, and each of the reference points $Q_{k,i}(\omega)$ of the given acquired image, with i=1, . . . , m, the error is obtained based on the following equation:

$$E_{k,i} = \Phi(Q_{k,i}(\omega)) - \begin{pmatrix} u_{k,i} \\ v_{k,i} \end{pmatrix}$$

Step 4: Calculation of the Cost Function

For each of the acquired images $I_k$, with k=1, . . . , N, and each of the reference points $Q_{k,i}(\omega)$ of the given acquired image, with i=1, . . . , m, the cost function is defined as:

$$J(\omega) = \sum_{k=1}^{N}\sum_{i=1}^{m}\|E_{k,i}\|^2$$

The cost function J enables to Optimize the Zang's method, in a second estimation of the parameters, such as the intrinsic parameters and the distortion coefficients.

The image acquisition module 12 comprises a camera having a lens.

The image acquisition module parameter may be the focal length of the lens of the camera.

The image acquisition module parameter may be a chromatism parameter of the lens of the image acquisition module.

The image acquisition module parameter may be a luminosity parameter of the lens of the image acquisition module.

The image acquisition module parameter may be a distortion coefficient of the lens of the camera.

The distortion coefficient may be radial distortion and/or tangential distortion and/or barrel distortion and/or pincushion distortion and/or decentering distortion and/or thin prism distortion.

The image acquisition module parameter may be the optical center of the lens of the camera.

Preferably, the steps S2 to S10 are reiterated at least nine times in order to have a robust value of the parameter of the acquisition module 12.

Said parameter value may be even more robust, if further reiteration of the steps S0 to S10 are proceeded, for example more than ten iterations, more than fifteen iterations, more than twenty iterations.

In each of the iteration the user is requested in the orientation step S6, solely to rotate the electronic device 10 according to the pitch axis X (FIG. 9) and/or the roll axis Y (FIG. 9) to move the second element **16*b* to a desired location with respect to the first element 16*a***.

No translation of the electronic device 10 with respect to the mirror 18, in the orientation step S6, is requested as it would not result in a different angular positioning of the electronic device 10 with respect to the mirror 18.

According to an embodiment, the steps S2 to S10 are repeated at least four times, and in each of this orientation step S6, the electronic device is rotated at least according to one rotational degree of freedom.

According to an embodiment, the steps S2 to S10 are repeated at least four times, and in each of this orientation step S6, the electronic device is rotated according to one rotational degree of freedom.

In an embodiment, the method may comprise an additional method step S0 being performed for each reiteration, starting from the second iteration.

The additional step S0 is a controlling step, wherein it is controlled that the new position of the first element **16*a* of the first pattern would lead to an orientation of the electronic device which is different from the orientations of the electronic device which has already been achieved in one of the previous iterations of steps S2 to S10**.

Namely the controlling step S0, aims to display the first element **16*a* at a particular location of the display screen 14** being different from the one used previously in the different initialization step S2 of the previous iterations.

FIG. 2a to 6d illustrate an electronic device comprising an image acquisition module 12 and display screen 14.

Figure 2A:
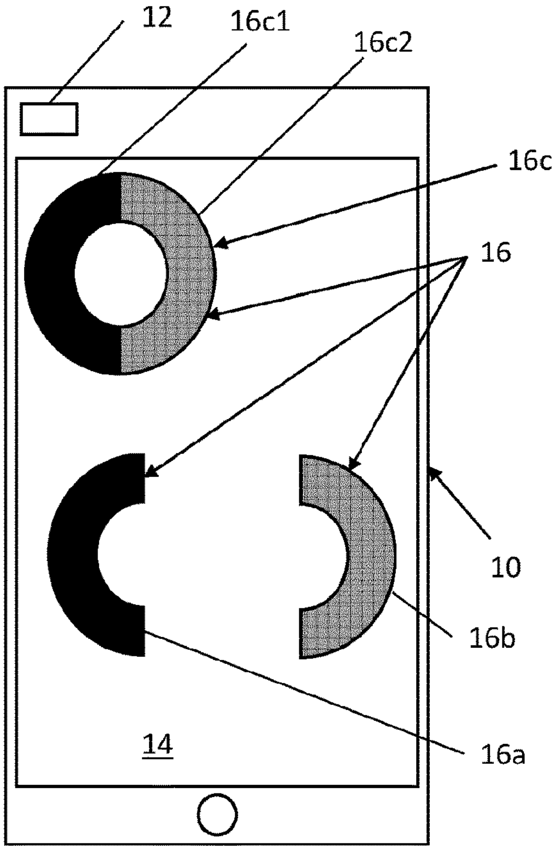
FIG. 2*a* is an example of first pattern according to a first embodiment.

FIG. 2a illustrates the display screen 14 according to the initialization step S2, wherein a first pattern 16 is displayed on the display screen 14.

The first pattern 16 comprises a first element 16a, a second element 16b and a third element 16c.

The third element 16c comprises at least a first portion 16c1 and a second portion 16c2. The arrangement of said first and second portions 16c1, 16c2 corresponds to a particular positioning of the first element 16a with respect to the second element 16b.

Advantageously, the third element is displayed to help the user when orientating the electronic device and to show the shapes to be achieved when moving the second element 16b with respect to the first element 16a.

Figure 2B:
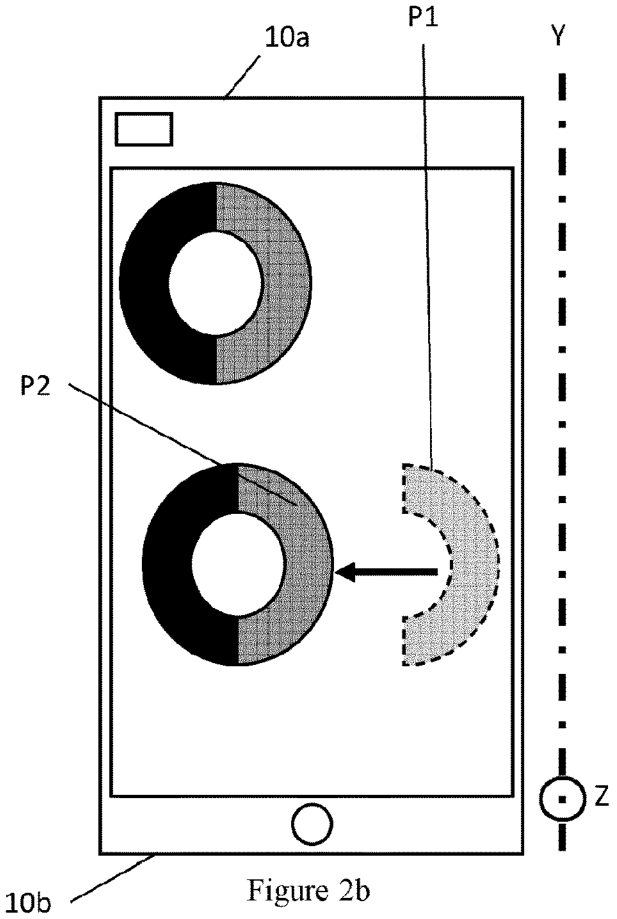
FIG. 2*b* is an example of first pattern according to a first embodiment, wherein the second element of the first pattern is moved to reach a target position.

The displacement shown in FIG. 2b, results from a rotation of the electronic device 10 in the orientation step S6, of the second element form a position P1 to a final position P2, where the arrangement of the first element 16a and the second element 16b is identical to the shape of the third element 16c.

The displacement of the second element 16b on the display screen 14 is caused by the orientation of the electronic device. A sensor measures the degree of rotation and/or inclination of the electronic device and based on the inclination measures by the sensor, a processor performs a translation of the second element 16b over the display screen 14.

The sensor might be an accelerometer and/or a gyroscope.

FIG. 2b illustrates a translation of the element 16b according to an axis. This translation results from an electronic device which has been rotated according to an axis, for example the roll axis Y (shown in FIGS. 2b and 9).

The first and the second elements 16a, 16b are considered to be forming a shape identical to the third element 16c, if the second element 16b is positioned with respect to the first element 16a making a form similar to the one of the third element 16c, tolerating a margin of a few pixels, for example 1 pixel or 5 pixels.

The given margin of a few pixels may be greater than 1 and smaller than 10 pixels, preferably smaller than 5 pixels.

The shapes of the first, second and third elements shown in FIGS. 2a to 2d are not limiting the scope of the invention and serve as exemplary embodiments. The first, second and third elements may have any desired shapes.

In the embodiment illustrated in FIG. 2a, the first element 16a is formed by a first half annular shape. The second element 16b is formed by a second half annular shape, having a complementary shape to the first half annular shape. The third element 16c has an annular shape. The first and the second portions 16c1, 16$c^2$ of the third element 16c have respectively half annular shape and are juxtaposed, so as to form the annular shape.

In the orientation step S6, the user is requested to move the second element 16b, by rotating the electronic device 10, in the manner that the arrangement between the first element 16a and the second element is identical, within a margin of few pixels, to the arrangement of the third and the fourth half annular shapes 161c1, 16$c^2$.

Figure 2C:
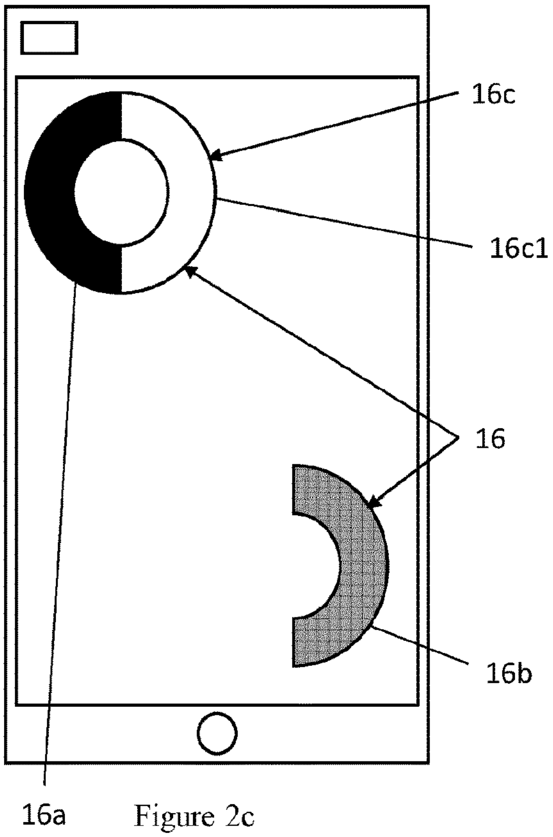
FIG. 2*c* is an example of first pattern according to a second embodiment.
Figure 2D:
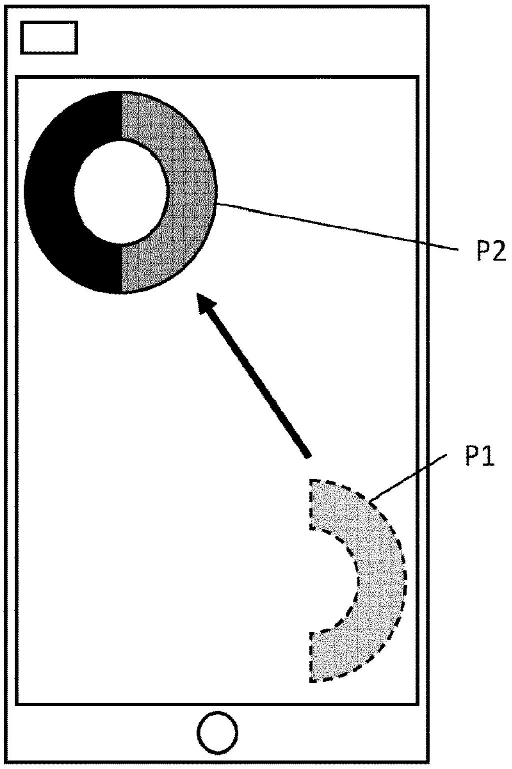
FIG. 2*d* is an example of first pattern according to a second embodiment, wherein the second element of the first pattern is moved to reach a target position.

FIG. 2c illustrates a second embodiment of the first pattern 16. The first element 16a and the third element 16c of the first pattern forms a single element.

During the orientation step S6, the electronic device 10 is oriented in a particular orientation such that the second element 16b fully overlaps a portion of the third element, and more particularly a portion 16c1 of the third element 16c.

In an embodiment, the first element 16a and the second element 16b have different colors.

In an embodiment, the first portions 16c1, 16$c^2$ of the third element 16c have different colors.

In a particular embodiment, the first element 16a has the same color as the first portion 16c1 of the third element. The second element 16b has the same color as the second portion 16$c^2$ of the third element. And the first element 16a and the second element 16b have different colors.

The electronic device 10 comprises a top portion 10a and a bottom portion 10b.

In an embodiment, the top portion 10a of the electronic device is positioned above the bottom portion 10b in each occurrence of the positioning step S4 and orientation step S6. The electronic device 10 remains substantially vertical during each of the positioning step S4 and orientation step S6.

If the user rotates the electronic device 10 about any angle of rotation, for example 180°, about a yaw axis Z (shown in FIG. 2b and FIG. 9), the same result may occur twice when taking into consideration a reference point determination step S10.

Following the orientation confirmation step S8, a second pattern 20 is displayed on the display screen 14. The second pattern comprises a set of fourth elements 20a, is a grid of circular elements.

The number of fourth element 20a to be displayed is depending on the size of the display screen 14 of the electronic device 10.

In an embodiment, the second pattern comprises at least two lines of two circular elements.

Figure 3A:
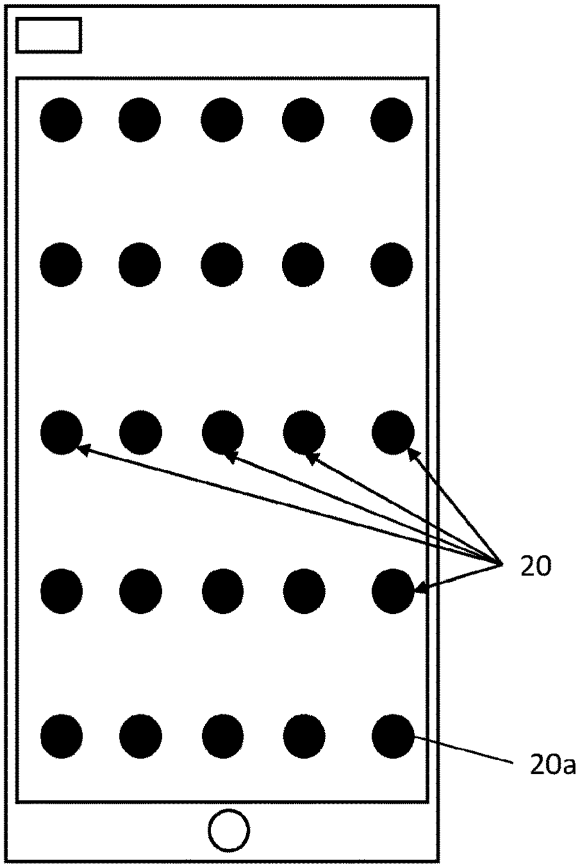
FIG. 3*a* is an example of second pattern according to a first embodiment.
Figure 3B:
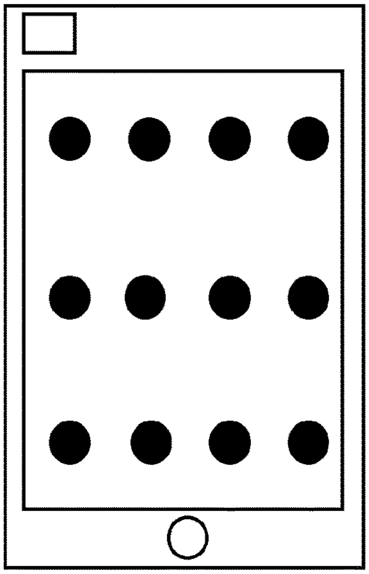
FIG. 3*b* is an example of second pattern according to a second embodiment.

The FIG. 3b illustrates a smaller electronic device 10 than the one illustrated in FIG. 3a, with a smaller display screen 14.

In the illustrative embodiment of FIG. 3a, five lines of five circular elements are disclosed. When in the illustrative embodiment of FIG. 3b, three lines of four circular elements are disclosed.

It is desired that each of the circular elements is clearly spaced from the neighboring circular elements to correctly define the border of said circular element.

In an embodiment, each of the fourth element 20a is spaced one from another of a given distance. Said given distance may be greater or equal than 2 mm and lower or equal to 3 cm, preferably greater or equal than 5 mm and lower or equal to 5 cm, and even more preferably greater or equal than 8 mm and lower or equal to 1.5 cm.

The circular elements can have different shapes.

In the embodiment illustrated in FIGS. 3a and 3b, the circular elements are formed by discs having a different color from the rest of the display screen.

Figure 3C:
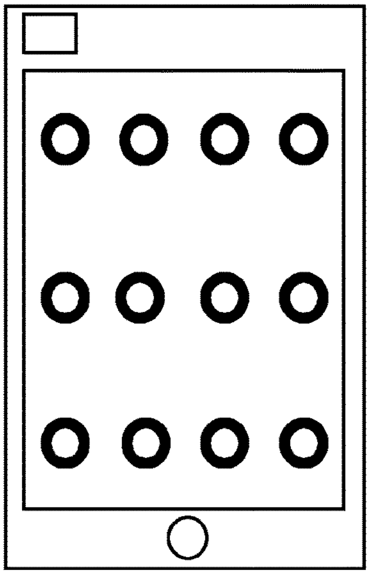
FIG. 3*c* is an example of second pattern according to a third embodiment.

In the embodiment illustrated in FIG. 3c, each of the circular elements are formed by annular elements.

The circular elements, being a disc or an annular element, and the remaining portion of the display screen have a different color.

In an embodiment, the circular elements, being a disc or an annular element, are black and the remaining portion of the display screen white.

Advantageously, said pattern provides a better blur management than a chessboard. In a chessboard, the vicinity of the black squares complicates to determine in a precise manner the limits of each square.

In an embodiment, the circular elements, being discs or annular elements, are green, and the remaining portion of the screen is black.

Figure 3D:
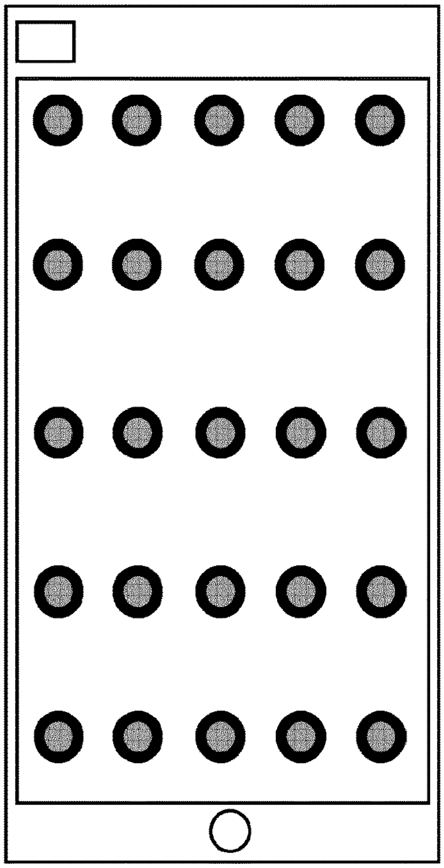
FIG. 3*d* is an example of second pattern according to a fourth embodiment.

In the embodiment illustrated in FIG. 3*d*, each of the circular elements, defining a fourth element 20*a*, comprises a disc and an annular element, the disc elements being contained in the annular element.

In a more preferred embodiment, the disc and the annular elements have different colors.

In an even more preferred embodiment, the disc, the annular elements and the remaining portion of the display screen have three different colors.

Figure 4A:
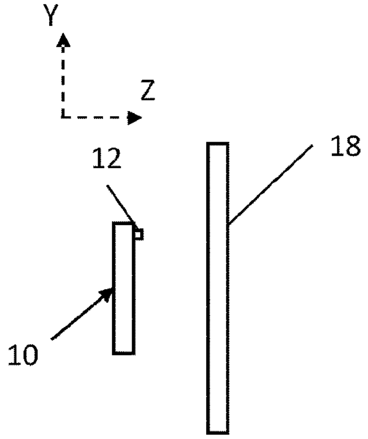
FIG. 4*a* to 4*c*, illustrates different predefined positions of an electronic device with respect to a mirror.
Figure 4B:
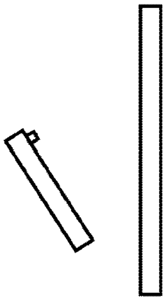
Figure 4C:
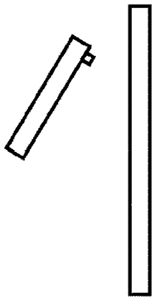

The FIGS. 4*a* to 4*c* illustrate embodiment regarding the position of the electronic device 10 with respect to the mirror 18 reached during the orientation step S6.

In the FIG. 4*a*, the electronic device 10 is hanging vertically sensibly parallel to the mirror 18, as requested in the position step S4.

In the FIG. 4*b*, the electronic device 10 has been rotated, during the orientation step S6, according to a first direction with respect to the pitch axis X (shown in FIG. 9).

Following, said first orientation of the electronic device 10 with respect to the mirror 18, an image of the second pattern reflected on the mirror is acquired by the acquisition module.

The image may be acquired automatically by the image acquisition device.

Alternatively, the user is requested to take the picture manually.

In the FIG. 4*b*, the electronic device 10 has been rotated, during the orientation step S6, according to a second direction with respect to the pitch axis X (shown in FIG. 9). The second direction being opposite to the first direction.

Following, said second orientation of the electronic device 10 with respect to the mirror 18, an image of the second pattern reflected on the mirror is acquired by the acquisition module.

The image processing library OpenCV allows to retrieve at least one intrinsic parameter of the acquisition device, as disclosed in the documentation "The Common Self-polar Triangle of Concentric Circles and Its Application to Camera Calibration", Haifei Huang, Hui Zhang and Yiu-ming Cheung. Said documentation discloses a method for a camera calibration consisting of the following steps:

Step 1: Extract the images of two concentric circles C˜1 and C˜2;

Step 2: Recover the image circle center and the vanishing line;

Step 3: Randomly form two common self-polar triangles and calculate the conjugate pairs;

Step 4: For three views, repeat the above steps three times; and

Step 5: Determine an image acquisition module parameters matrix using Cholesky factorization.

The calibration method according to the invention provides a better blur management than the OpenCV mentioned above. The accuracy of the result is strongly linked to the precision of the detection of these reference points, and as a consequence the determination of at least one parameter of the image acquisition module 12.

High precision is crucial, mainly when blurry images are captured by the image acquisition module.

In order to improve the accuracy, it is preferable to improve the method of determination of reference points of the circular element, of each of the fourth element 20*a* of the second pattern 20, and to use pattern that are less sensitive to blur.

Advantageously, the use of a method involving the detection of circular elements, of each of the fourth element 20*a* of the second pattern 20, and the determination of their reference points is more robust rather than determining the intersection of contract colors for example the arrangement of black and white squares on a chessboard.

There are two ways to improve accuracy: the first one is to improve the detection of the center of the pattern, the second is to use pattern that are less sensitive to blur.

The reference point determination step S10 is achieved with respect to the image acquired by the image acquisition module.

The reference point determination step S10 comprises two embodiments depending on the set of fourth elements 20*a* is formed by discs or annular elements.

In each of the embodiments relative to the reference point determination step S10, the OpenCV algorithm is solely used to identify the circular elements 20*a* the second pattern 20.

Figure 5:
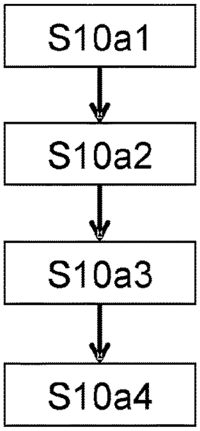
FIG. 5 is a flowchart of the reference point determination step according to a first embodiment the disclosure.
Figure 6:
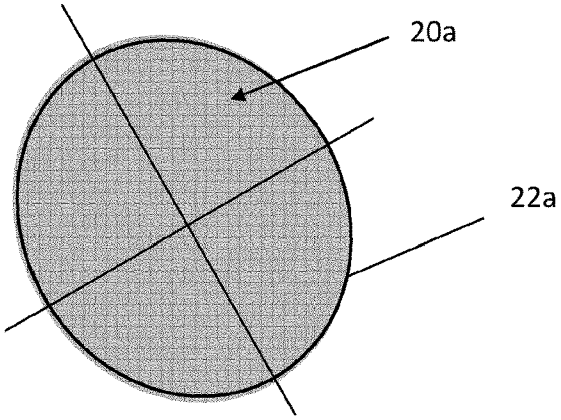
FIG. 6 is an illustration of the reference point determination step according to the first embodiment.

FIGS. 5 and 6 relate to the embodiments, wherein the set of fourth elements 20*a* is formed by discs.

The reference point determination step S10 comprises the following sub steps being performed for each of the fourth elements 20*a* of the second pattern:

- a cropping step S10*a*1, wherein the image is cropped around the disc formed by the given fourth element 20*a* (this is illustrated in FIG. 6),
- a contour detecting step S10*a*$^2$, wherein the contour of the disc formed by the given fourth element 20*a* is detected,
- a contour approximation step S10*a*3, wherein the contour of the disc formed by the given fourth element 20*a* is approximated by an ellipse 22,
- a reference point determination step S10*a*4, wherein the reference point is determined.

In said embodiment, the reference point of each disc is formed by the center of the ellipse 22.

Figure 7:
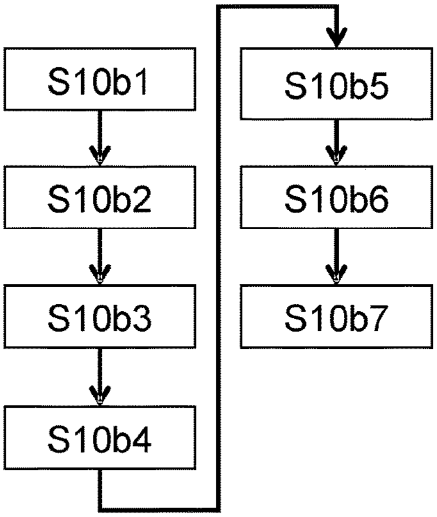
FIG. 7 is a flowchart of the reference point determination step according to a second embodiment the disclosure.
Figure 8:
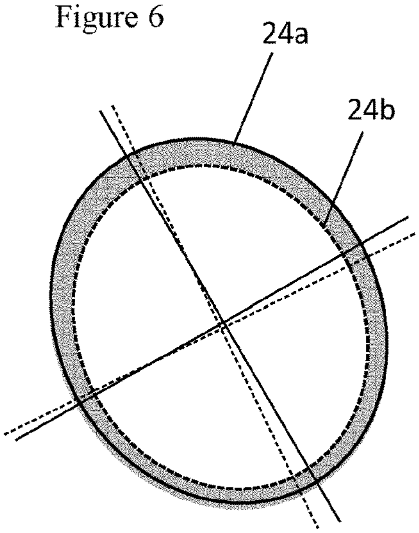
FIG. 8 is an illustration of the reference point determination step according to the second embodiment.

FIGS. 7 and 8 relate to an alternative embodiment wherein the set of fourth elements 20*a* is formed by annular elements.

In order to further improve the accuracy of the reference point detection, the color of annular elements and their environment may be modified.

In order to easily find each ring, three colors can be used.

In this particular embodiment, the remaining portion of the display screen 14 not covered by fourth elements 20*a* is black. The annular element has a green color. And the central portion of the annular element, forming a disc, is blue or red.

Pixel's color of a displayed image are conditioned by the free following channel color R (red), G (green), B (blue). Each pixel p(i,j) of the acquired image as a level of each color RGB between 0 and 255.

For example, Black is (0,0,0) and white is (255,255,255).

A green pixel is defined as follows (0, 255, 0).

And the image is composed of three matrices R(i,j), G(i,j), B(i,j).

A grey image is defined as grey(i,j)=min(R(i,j), G(i,j) B(i,j)). In the grey image the circular elements 20*a* formed by annular elements are converted into discs.

Advantageously, using a grey image helps to find the locations of the fourth elements 20*a*.

Then, it is proceeded to green channel in further image processing of the acquired image by the image acquisition module 12.

Advantageously, green channel is used to enhance the contrast.

Following the use of green channel, the detection of the annular element is enhanced.

From the grey image, a first approximation of the center of each disc is obtained, using for example an Opencv function.

Then for each annular element detected, the reference point is estimated using two ellipses relative to the approximated internal and external contour of the annular element. This method provides a better estimation of the center of the reference point.

The reference point determination step S10 comprises the following sub steps being performed for each of the fourth elements 20*a* of the second pattern:

- an external contour detecting step S10*b*1, wherein the external contour of the annular element formed by the given fourth element 20*a* is detected with respect to the remaining portion of the image,
- a cropping step S10*b*$^2$, wherein the image is cropped around the detected external contour of the given fourth element 20*a* (this is illustrated in FIG. 8),
- an internal contour detecting step S10*b*3, wherein the internal contour of the annular element from the given fourth element 20*a* is detected with respect to the remaining portion of the cropped image,
- an external contour approximation step S10*b*4, wherein the external contour of the annular element from the given fourth element 20*a* is approximated by a first ellipse 24*a,*
- an internal contour approximation step S10*b*5, wherein the internal contour of the annular element from the given fourth element 20*a* is approximated by a second ellipse 24*b,*
- an ellipse center determining step S10*b*6, wherein the center of the first ellipse 24*a* and the center of the second ellipse 24*b* are determined,
- a reference point determination step S10*b*7, wherein the reference point of the given fourth element 20*a* is determined based on the center of the first and second ellipses.

Preferably, the internal and the external contour determination steps S10*b*3 and S10*b*4 are performed thanks to an algorithm using green channel enhancing the contrast and helping determine the internal and the external contour of the green annular element.

In order to further improve the determination of the internal and the external contours of the annular element, an additional program can be executed to avoid outliers.

This algorithm consists in extracting the green annular element and determining the first ellipse 24*a* corresponding to the external contour and the second ellipse 24*b* corresponding to the internal contour of the annular element. Following the determination of said ellipses, the method of the mean square is used to calculate the center, the radius according to the semi minor axis and to the semi major axis of each of the ellipses.

Based on the center of the two ellipses, the reference point can be acquired.

When considering a second pattern comprising at least one square element, at least one triangle, at least one polygonal element, the first ellipse corresponds to an estimation of a circumscribed circle and the second ellipse corresponds to an estimation of an inscribed circle.

Based on the determination of the reference points of the set of fourth elements, at least one parameter of the acquisition module is derived. More specifically, the value of said at least one parameter of the acquisition module is determined According to an embodiment, a database may comprise parameters of the acquisition module provided by the manufacturer.

According to an embodiment, a database may comprise a determination of a value of at least one parameter of the acquisition module provided by certified organization.

According to an embodiment, a database may store a determination of a value of at least one parameter of the acquisition module provided by a user achieving the method according to the invention.

In a more particular embodiment, the database may store a database may store a determination of a value of at least one parameter of the acquisition module provided by a plurality of users achieving the method according to the invention. The database may also comprise a parameter mean value, the parameter mean value corresponds to the average of the determined value of the at least one parameter of the acquisition module provided by the plurality of users achieving the method according to the invention.

Figure 10:
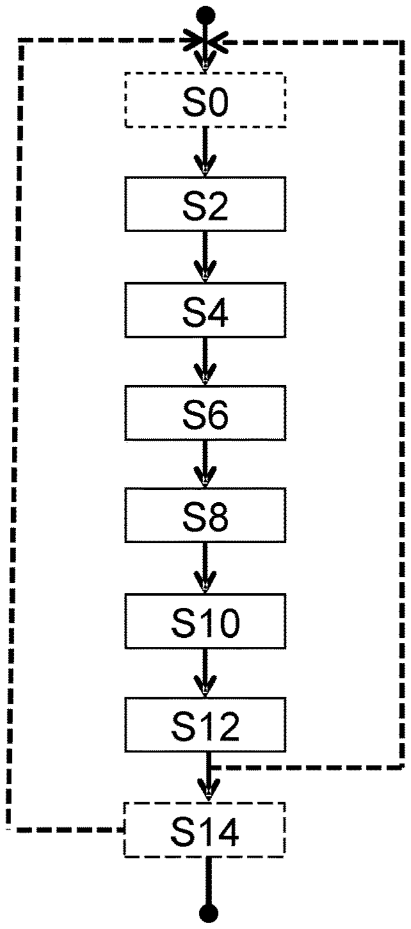
FIG. 10 illustrates a flowchart of a method for determination according to an embodiment of the disclosure.

The method according to invention may comprise an additional steps S14 shown in FIG. 10.

A database comparison step S14, wherein the value of the image acquisition module 12, determined in the parameter determination step S12, is compared to a value of said parameters stored on the database. The value of said parameters stored on the database is for example provided by the manufacturer, by certified organization, by a user or an average of the determined value of the at least one parameter of the acquisition module provided by the plurality of users achieving the method according to the invention.

If the difference, in absolute value, between the value of the image acquisition module 12, determined in the parameter determination step S12 and the value of said parameter stored in the database is smaller or equal to 5%, for example smaller or equal to 2%, of the value of said parameter stored in the database, the value of the image acquisition module 12 determined in the parameter determination step S12 is confirmed.

If the difference is bigger than 5%, the user performing the method according to the invention is requested to reproduce the steps S2 to S12 at least one more time. Preferably, the steps S2 to S12 are reproduced until the difference, in absolute value, between the value of the image acquisition module 12, determined in the parameter determination step S12 and the value of said parameter stored in the database is smaller or equal to 5% of the value of said parameter stored in the database.

In a particular embodiment, the method according to the invention may not require at least nine reiteration of the steps S2 to S10, if the difference, in absolute value, between the value of the image acquisition module 12, determined in the parameter determination step S12 and the value of said parameter stored in the database is smaller or equal to 5% of the value of said parameter stored in the database.

The electronic device 10 is used to determine at least one of optical fitting parameters of a user, optical parameters of an optical lens, acuity parameters of a user.

The fitting parameters comprises:

- the distance between the center of both pupil of the eyes of the user; and/or
- the distances between the center of each pupil and the sagittal plan of the user, and/or
- an indication of the height of the center of each pupil of the user, and/or
- indication of the shape of the nose of the user; and/or
- indication of the shape of the cheekbone of the user.

The optical parameter of the lens comprises:
the dioptric function of the optical lens; and/or
the optical power in a visual reference zone of the optical lens; and/or
the optical cylinder in a visual reference zone of the optical lens; and/or
the optical cylinder axis in a visual reference zone of the optical lens; and/or
the prism base in a visual reference zone of the optical lens; and/or
the prism axis in a visual reference zone of the optical lens; and/or
the type of optical design of the optical lens; and/or
the transmittance of the optical lens; and/or
the color of the optical lens; and/or
the position of the optical center on the lens.

The disclosure has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. A method for determining at least one parameter of an image acquisition module of an electronic device, the electronic device having a display screen and the image acquisition module on a same side of the electronic device, the method comprising:

a) an initialization step, wherein a first pattern is displayed on the display screen:
the first pattern comprises a first element, a second element and a third element,
the first element having a fixed location on the display screen,
the second element is movable over the screen based on an orientation of the electronic device, and
the third element has a particular shape corresponding to a particular positioning of the second element with respect to the first element;

b) a positioning step, wherein the electronic device is positioned in front of a mirror, the display screen facing the mirror;

c) an orientation step, wherein the electronic device is oriented in a particular orientation such that the second element of the first pattern is moved to reach a target position, wherein when the target position is reached, the positioning of the second element with respect to the first element forms a shape identical to the particular shape of the third element;

d) an orientation confirmation step, wherein the electronic device is maintained in the particular orientation during a period of time, then:
the first pattern is no longer displayed,
a second pattern is displayed, the second pattern comprising a set of fourth elements having fixed locations on the screen, and
a picture of the second pattern seen through the mirror is acquired by the image acquisition module;

e) a reference point determination step, wherein said set of fourth elements of the second pattern are detected and a reference point associated to each said fourth element is determined, steps a) to e) are reiterated several times, wherein each time the position of the first element of the first pattern is different, resulting in different orientations of the electronic device in the orientation step c); and f) image acquisition module parameter determination step, wherein based on said reference points of each element of the set of fourth elements obtained during each orientation of the electronic device, the image acquisition module parameter is determined.

2. The method according to claim 1, wherein the image acquisition module comprises a camera having a lens and the image acquisition module parameter is a parameter of the lens of the image acquisition itself.

3. The method according to claim 2, wherein at least one image acquisition module parameter is:
a focal length of the lens of the image acquisition module; and/or
a chromatism parameter of the lens of the image acquisition module; and/or
a luminosity parameter of the lens of the image acquisition module; and/or
a distortion coefficient of the lens of the image acquisition module; and/or
an optical center of the lens of the image acquisition module; and/or
a dioptric optical power of the lens of the image acquisition module; and/or
an optical cylinder of the lens of the image acquisition module; and/or
an optical cylinder axis in a visual reference zone of the lens of the image acquisition module; and/or
a prismatic power of the lens of the image acquisition module; and/or
a prism orientation of the lens of the image acquisition module; and/or
a transmittance of the lens of the image acquisition module; and/or
a color of the lens of the image acquisition module; and/or
the position of the optical center on lens of the image acquisition module.

4. The method according to claim 1, during each reiteration, prior to step a), the method comprises:
g) a controlling step wherein, it is controlled that a new position of the first element of the first pattern would lead to an orientation of the electronic device which is different from the orientations of the electronic device which has already been achieved in one of the previous iterations of steps a) to e).

5. The method according to claim 1,
wherein the first element and the third element of the first pattern forms a single element, and
wherein during the orientation step c), the electronic device is oriented in a particular orientation such that the second element fully overlap a portion of the third element.

6. The method according to claim 1, wherein the electronic device comprises a top portion and a bottom portion, and the top portion is positioned above the bottom portion in each occurrence of the positioning and orientation step b) and c), the electronic device remaining substantially vertical during each of the positioning and orientation step b) and c).

7. The method according to claim 1, wherein the second pattern, comprising the set of fourth elements, is a grid of circular elements.

8. The method according to claim 7, wherein a number and/or a dimension of the circular elements is depending on a dimension of the display screen.

9. The method according to claim 7, wherein each of the circular elements comprises a disc, the discs having a different color from the rest of the display screen.

10. The method according to claim 9, wherein the circular elements reference point determination step e), comprises, for each of the circular elements:

cropping the image around the disc, detecting a contour of the disc, approximating the contour of the disc by an ellipse, and determining the reference point being the center of the ellipse.

11. The method according to claim 7, wherein each of the circular elements comprises an annular element.

12. The method according to claim 11, wherein the circular elements reference point determination step e), comprises, for each of the circular elements:

detecting an external contour of the annular element, cropping the image around the external contour of the annular element, detecting an internal contour of the annular element, approximating the external contour of the annular element by a first ellipse, approximating the internal contour of the annular element by a second ellipse, determining a center of the first ellipse and a center of the second ellipse, and determining the reference point based on the center of the first and second ellipses.

13. The method according to claim 11, wherein the annular elements and other portion of the screen have different colors.

14. The method according to claim 11, wherein the annular elements are green, and remaining portion of the screen is black.

15. The method according to claim 7, wherein each of the circular elements comprises a disc and annular elements, the disc elements being contained in the annular elements.

16. The method according to claim 15, wherein the annular elements and the disc elements have different colors.

17. A non-transitory computer program product comprising one or more stored sequences of instructions which, when executed by processing circuitry, perform the parameter determining step of the method according to claim 1.

18. The method according to claim 11, wherein the annular elements are black and remaining portion of the display screen is white.

* * * * *